Oct. 23, 1951  A. G. PERKINS  2,572,658
AUTOMATIC TEAT CUP RELEASE DEVICE FOR MILKING MACHINES
Filed Feb. 16, 1948  3 Sheets-Sheet 1

INVENTOR
Albert G. Perkins
BY Walter P. Geyer
ATTORNEY

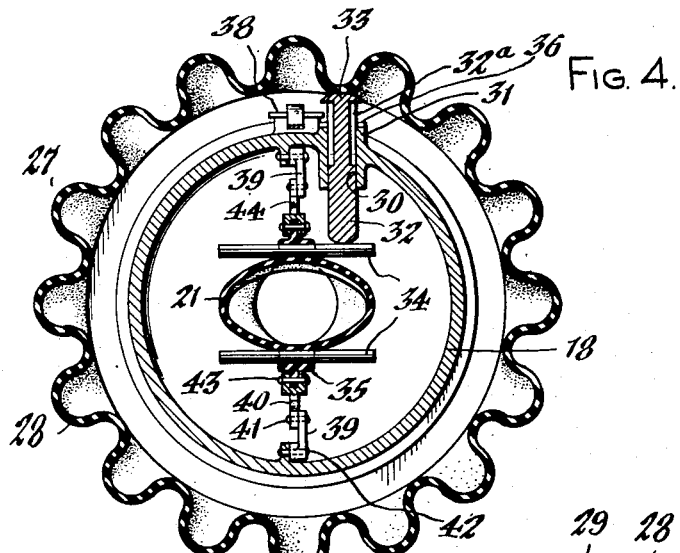
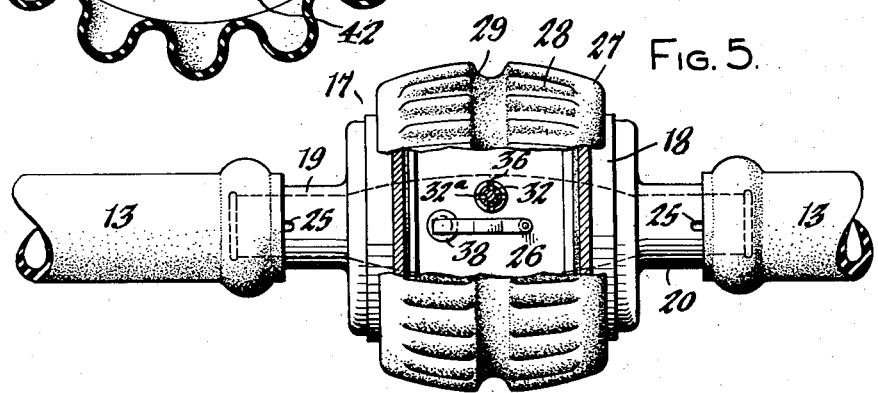
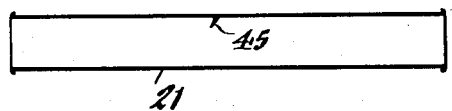
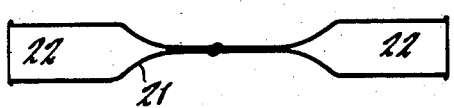
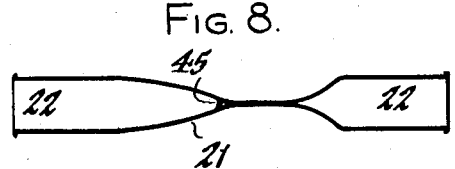
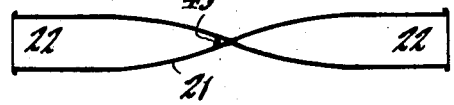

Oct. 23, 1951　　　A. G. PERKINS　　　2,572,658
AUTOMATIC TEAT CUP RELEASE DEVICE FOR MILKING MACHINES
Filed Feb. 16, 1948　　　3 Sheets-Sheet 3

INVENTOR
Albert G. Perkins,
BY Walter P. Guyer
ATTORNEY

Patented Oct. 23, 1951

2,572,658

UNITED STATES PATENT OFFICE 2,572,658

AUTOMATIC TEAT CUP RELEASE DEVICE
FOR MILKING MACHINES

Albert G. Perkins, Grand Island, N. Y.

Application February 16, 1948, Serial No. 8,667

25 Claims. (Cl. 119—14.08)

This invention relates generally to the art of milking machines but more particularly to an automatically operated teat cup releasing device for such machines for causing the dropping of the teat cups from the cow as the respective quarters of the cow's bag are milked out, and thereby prevent injury to the cow by leaving the machine on her too long.

One of the objects of the invention is to provide a device of this character which is adapted to be interposed in the milk flow line from the cow to the can and whose parts are so organized and arranged as to effectually and positively shut off the vacuum to the teat cup when a given quarter of the cow's bag has been milked out to thereupon cause that teat cup to automatically drop from the cow, and subsequently cause such parts to be restored to their initial position ready for attachment to another cow.

Another object is to provide a sanitary and self-contained, automatic teat cup releasing device for milking machines which is simple and compact in construction, which is vacuum governed, and whose operating mechanism is isolated from contact with the milk and wherein the shutting off of the vacuum to the teat cup is accomplished directly by the collapse of the tube or conduit through which the milk flows from the cow to the can.

Other features of the invention reside in the construction and arrangement of parts hereinafter described and particularly pointed out in the appended claims.

Figure 1:
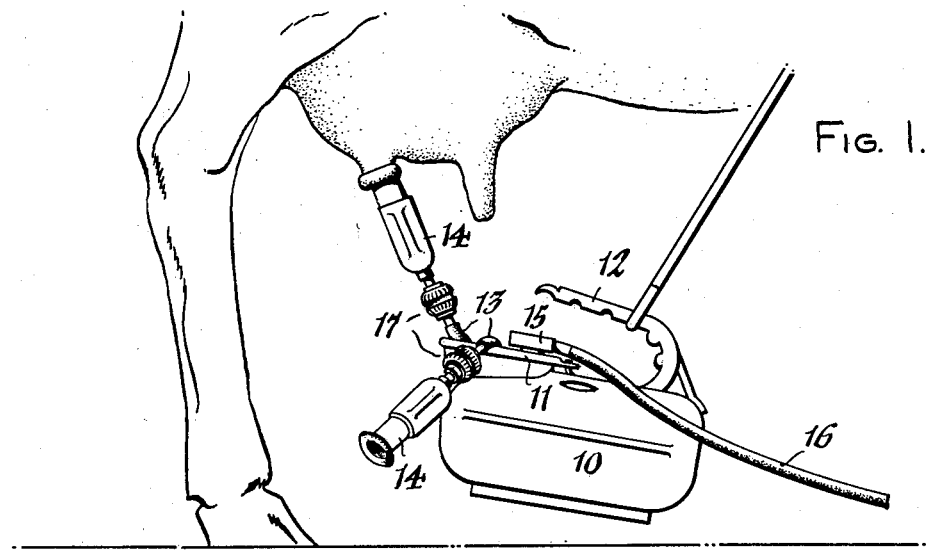
Figure 2:
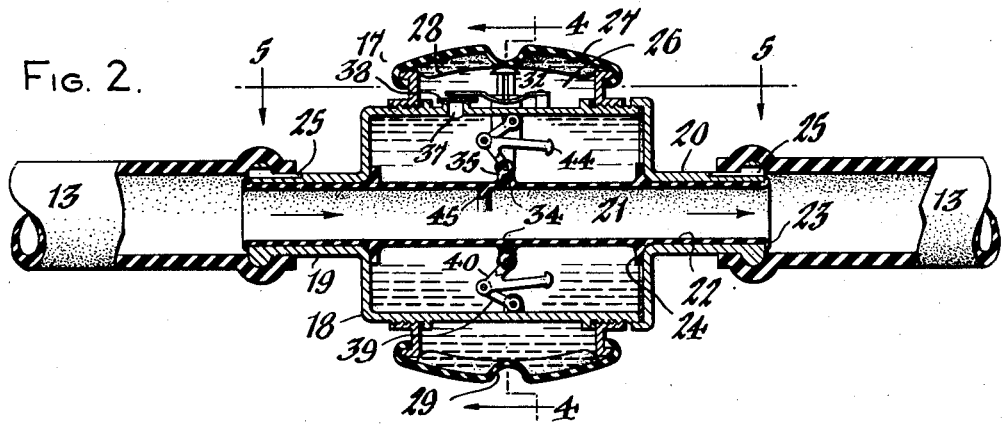
Figure 3:
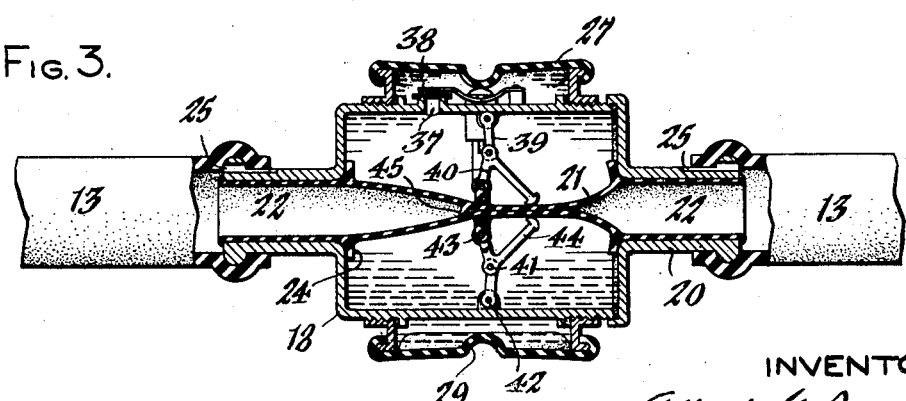
Figure 10:
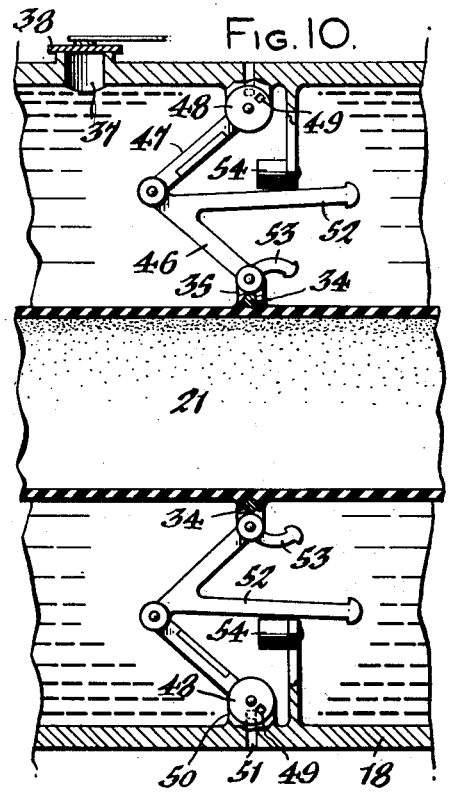
Figure 11:
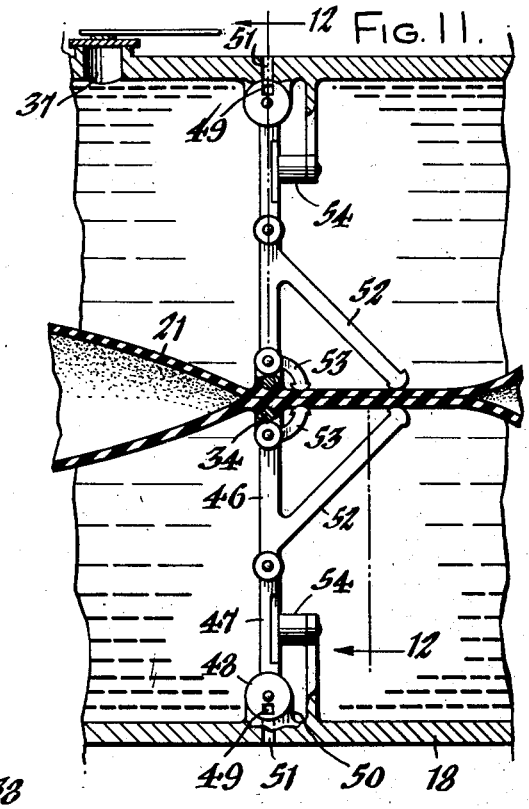
Figure 12:
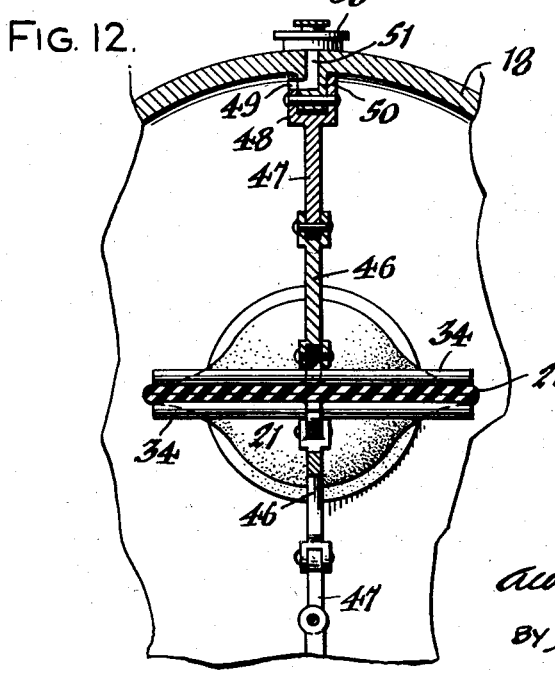

In the accompanying drawings:

Figure 1 is a side view of a milking machine suspended in operative relation to the cow and showing my control device in the teat cup connections thereof, one of the teat cups being shown as having been automatically dropped from the cow. Figures 2 and 3 are enlarged vertical longitudinal sections of one of the devices showing the parts in milking and shut off positions, respectively. Figure 4 is an enlarged cross section taken on line 4—4, Figure 2. Figure 5 is a horizontal section taken on line 5—5, Figure 2. Figures 6, 7, 8 and 9 are diagrammatic views showing the various positions assumed by the milk flow collapsing tube or conduit-section including, respectively, the normal milking position, the shut off position, the teat-dropping-off position and the restoring position. Figures 10 and 11 are greatly enlarged fragmentary sectional views of the body portion of the devices, similar to Figures 2 and 3, but showing a modified form of the invention. Figure 12 is a cross section taken on line 12—12, Figure 11.

Similar characters of reference indicate corresponding parts throughout the several views.

By way of example, I have shown my teat cup dropping control device or controlled quarter milker applied to a well known type of pulsating milking machine, wherein 10 indicates the milk-receiving can having the customary cover 11 and bail 12, the cover having milk-intake tubes (not shown) radiating therefrom and each connected by a flexible conduit or hose connection 13 having a teat cup 14 at its free end for detachable connection to one of the cow's teats. Also applied to the cover is the customary pulsator 15 which is connected by a hose 16 to the suction source. Interposed substantially axially in each hose connection 13 is one of my control units indicated generally by the numeral 17, through which the milk flows from the cow to the can, and which functions, as each quarter of the cow's bag is milked out, to automatically shut off the vacuum thereto and cause the companion teat cup to drop from the cow, as depicted in Figure 1, to effectually prevent injury to the cow from overmilking, and subsequently cause the automatic restoration of the unit to its initial position.

In the embodiment of the invention shown in Figures 1–9 inclusive each control unit consists of a cylindrical body 18 having nipples 19 and 20 projecting axially from its opposite ends to which the intake and outlet branches of the milk flow conduit 13 are connected, and having a collapsible section or tube 21 of rubber or the like extending axially thereof and having attaching portions 22 fitted in the bores of said nipples. As shown in Figure 2, this tube has end flanges or shoulders 23 which engage the outer ends of the respective conduit-attaching nipples and intermediate flanges or shoulders 24 which abut against the opposing inner faces of the end walls of the body 18. That portion of the collapsible tube between the end body walls, and which is adapted to be collapsed or deflated to a sealing position, as shown in Figure 3, to shut off the vacuum to the companion teat cup when that quarter of the cow's bag is milked out, is somewhat laterally enlarged and substantially elliptical in cross section, as shown in Figures 4 and 5, to more readily respond to its collapsing or shut off position. Means are provided adjacent the opposite ends of the tube-section 21 to vent the same to the atmosphere, and by way of example, vent passages 25 are provided between the nipples 19, 20 and the attaching portions of the conduit 13 to properly vent the conduit to the atmosphere after the companion quarter of the cow's bag has been milked out to permit the corresponding teat cup to drop from the cow and the displaced parts of the control unit to return to their initial or normal positions.

Surrounding the body 18, which constitutes a fluid chamber, is an outer chamber 26 in controlled fluid communication therewith and having an outer contractible wall 27 of rubber or like material provided with radial corrugations 28 and a central annular corrugation 29 to facilitate the contracting and expanding movements of such wall. These chambers are filled with a constant viscosity fluid and in response to the vacuum which is present in the conduit section when a given quarter of the cow's bag is milked out, the fluid in the outer chamber flows into the inner or body-forming chamber, as shown in Figure 3, to cause the collapse of the collapsible conduit section or tube 21. Guided in an opening 30 formed in a collar 31 applied to the body 18, and of a fit sufficiently loose that a capillary-like vent is provided between the outer chamber 26 and body-chamber, is a displaceable ported member 32 in the form of a stem or plunger having a head 33 at its outer end normally abutting the contractible wall 27, as shown in Figures 3 and 4. At its inner end this ported member abuts against the opposing one of two bars 34 applied to the top and bottom sides of the tube 21 which assure its proper and uniform collapse. These bars may be detachably fitted in companion ears or lugs 35 formed on the tube. In its surface the outer portion of the member 32 has longitudinal ports or by-pass grooves 32ª therein which serve to establish free flow communication of the fluid from the outer chamber into the inner chamber when the stem is displaced inwardly by the contractible wall 27 to a position to cause such ports to bridge or span the opposite ends of the opening in the guide collar 31 to thereby result in a prompt and smart collapse of the tube 21. The outer face of this collar has radial grooves 36 therein so that in the inwardly displaced position of the ported member 32, with its head 33 abutting said collar, its ports are not shut off but fluid communication between the chambers is maintained and at a predetermined time subsequent to the teat cup dropping from the cow as the result of the contraction of the tube 21, in the manner shown in Figure 3 and diagrammatically in Figures 7 and 8, the fluid will be free to reverse its flow from the inner chamber to the outer chamber as atmosphere is admitted to the opposite ends of the collapsed tube-section to restore the parts to their original position shown in Figures 2 and 4. A second fluid or by-pass port 37 is provided in the body 18 which is normally yieldingly closed by an inwardly-closing check valve 38, but which is adapted to open in response to the surge of milk flowing through the tube-section 21 or during the restoring cycle of operations and accelerate the reverse flow of fluid.

Disposed diametrically between the body 18 and the collapsible tube section 21 is a flexible or folding connection which functions to maintain this tube section closed when the teat cup is ready to be released and prevent atmospheric pressure from opening the tube section at that time. The connection preferably consists of two pairs of arms or links 39, 40, each pair being pivotally connected at 41 to each other and at 42 and 43, respectively, to the body and to the bar-engaging ear 34. Extending from each inner arm 40 is a finger 44 having a rounded head which, during the collapse of the tube section 21, is adapted to swing toward the opposing side thereof and eventually contact and uniformly hold such tube section together. In the final extension of the pivoted arms the pivots 41 are slightly beyond dead center, and the tube-engaging fingers serve to maintain the tube in its closed or sealed position until the teat cup is released from the cow. When the teat cup is released, then atmosphere is admitted through the vent passage 25 at the opposite or can-facing end of the unit to cause the inflation of the adjoining portion of the tube section 21 with the result that the folding connections 39, 40 are restored to their initial position and the tube section to its fully open position shown in Figure 2.

Extending across the inner face of one side of the collapsing tube section 21 is an obliquely-disposed lip 45 which, when the tube is collapsed, abuts against the opposing inner face thereof and thus affords an auxiliary seal therefor.

In operation, each control unit operates independently to shut off the vacuum to its teat cup when the companion quarter of the cow's bag is milked out, the vacuum at that time becoming substantially constant instead of in pulsations when the milk is surging normally through the unit, and causing the latter to assume the position shown in Figures 3 and 7, with the tube section 21 drawn together or sealed to shut off the vacuum to the teat cup and allow the latter to be released and to drop from the cow, as depicted in Figure 1, with the hose 13 thereof bent across the open end of its companion cover intake tube, in the manner shown, for example, in my prior Patent No. 2,496,307. Upon the collapsing of the tube section 21, atmosphere is admitted through the vent passages 25 which results, firstly, in the teat cup dropping from the cow, such condition of the tube section being diagrammatically shown in Figure 8, and secondly, in the inflation of the opposite ends of such tube-section, as shown in Figure 9, to initiate the folding of the links 39, 40 to their initial position and the reverse flow of the fluid from the inner chamber 18 to the outer chamber or reservoir 26 to restore the parts to their normal milk flow positions. During the normal milking operation with the milk surging through the unit, the tube section 21 and flexible outer wall 27 and associated parts may be displaced or fluctuated somewhat in response to the fluctuations of the milking machine or should the cow temporarily let up on her milking, but such displacement, because of the time element transpiring during the pauses of the milking cycle or that of the cow holding up on her milking, is not sufficient to place the ported member 32 in open communication with the respective fluid chambers. During such periods the fluid displacement is through the capillary channel or concentric space between the ported member 32 and its guide opening 30. However, when the vacuum is sufficient to open the ported member with its by-pass grooves 32a opening beyond ends of the collar 31, then the rush of fluid from the reservoir 26 into the body-chamber 18 allows a prompt and complete collapse of the tube section 21 to its closed position.

In the modification shown in Figures 10-12 inclusive, the displaceable ported valve member 32 is eliminated and the port-control between the fluid chambers 18 and 26 is embodied in and governed by the tube-contracting linkage. To this end, each pair of links includes inner and outer arms 46 and 47 pivoted to each other and to the tube section 21 and body 18, respectively, the outer arm having a hub 48 containing a transverse port 49 and its companion pivot-connecting lug 50 having an L-shaped port 51 therein whose inner end is adapted to register with said hub-port and whose outer end extends through the adjoining wall of the body 18 to communicate with the surrounding fluid chamber 26. In the normal milk flow position of the parts, shown in Figure 10, the hub-port 49 is out of register with its companion lug-port 51. However, as the tube section 21 approaches its collapsed position, the hub-port registers with the lug-port to establish free flow of the fluid from the outer chamber to the inner chamber and the resultant complete and prompt collapse and sealing of such tube section. The inner arm 46 has outer and inner fingers 52, 53 which firmly and effectually grip and hold the tube section in its sealed position. For the purpose of urging the extension of the folding links smartly to their gripping position, a permanent magnet 54 is disposed in their extending path and such magnet serves to maintain the fingers in their operative position until such time as the teat cup is released from the cow, when the fingers are released by the subsequent expansion of the tube section in the manner previously described.

I claim as my invention:

1. The combination with a milking machine having a teat connection for conducting milk by vacuum from the cow to the can, of a control unit interposed in said connection for causing the shutting off of the vacuum thereto when the cow's bag is milked out including a collapsible tubular member attached at its opposite ends in communicating relation to the opposing portions of said connection, vent passages to the atmosphere provided adjacent the opposite ends of such connection and the attaching ends of said collapsible member, and vacuum-responsive displaceable means disposed externally of and in governing relation to and movable coincidentally with said collapsible member for automatically regulating its collapse to a closed position when the flow of milk therethrough substantially ceases.

2. The combination with a milking machine having teat connections for conducting milk by vacuum from the cow to the can, of a control unit interposed in each of said connections for causing the shutting off of the vacuum thereto when the companion quarter of the cow's bag is milked out including a body having a collapsible member extending therethrough and through which the milk flows by vacuum from the cow to the can, displaceable means in said body in operative external relation to said member, to effect its collapse, and control means in operative governing relation to said displaceable means to automatically regulate the same to restrain the complete collapse of said member during the normal milking operation as well as at such times as the cow may temporarily let up on her milking, and to render such displaceable means operative to effect, without restraint, the complete collapse of said member when the flow of milk has substantially ceased.

3. The combination with a milking machine having teat connections for conducting milk by vacuum from the cow to the can, of a control unit interposed in each of said connections for causing the shutting off of the vacuum thereto when the companion quarter of the cow's bag is milked out including a body defining intercommunicating inner and outer concentric fluid chambers having valve means for controlling the interflow of fluid therein in response to vacuum variations created in such connections during the milking operation, and a collapsible tube member fitted in said body and extending through its inner chamber coaxially thereof and of said connection for the vacuum-induced flow of milk therethrough and externally governed by the surrounding fluid when seeking a collapsed sealed position in response to the vacuum created in said connection when such quarter of the cow's bag is milked out, said tube being normally maintained against collapse by the surge of milk flowing therethrough.

4. The combination with a milking machine having a teat connection for conducting milk by vacuum from the cow, of a control unit interposed in said connection including a body having intercommunicating fluid-filled chambers and a collapsible tubular member in milk flow communication with said connection and extending through one of said chambers in fluid-sealed relation thereto, and valve means disposed in operative relation to said fluid chambers to automatically govern the interflow of fluid therebetween for resisting the collapse of the tubular member during normal milking operations and for causing its automatic collapse when the flow of milk subsequently ceases.

5. The combination with a milking machine having a teat connection for conducting milk by vacuum from the cow, of a control unit interposed in said connection including a multi-chambered body and a collapsible tubular member in milk flow communication with said connection and extending through one of said chambers in fluid-sealed relation thereto, and valve-controlled fluid displaceable means within the chambered body in operative external relation to said tubular member for resisting its collapse during normal milking operations and governed by the flow of milk therethrough to cause its automatic collapse when the flow of milk substantially ceases.

6. The combination with a milking machine having teat connections for conducting milk by vacuum from the cow to the can, of a control unit interposed in each of said connections for causing the shutting off of the vacuum thereto when the companion quarter of the cow's bag is milked out including a fluid-filled body having a collapsible tube section extending axially of and in fluid-sealed relation thereto and in milk and vacuum flow communication with said connection, and a fluid reservoir disposed about said body in valved communication therewith and including a flexible outer wall, the fluid in said body regulating the partial collapse of said tube section during the surge of milk therethrough and serving to govern the complete collapse of said section by the vacuum therein after the surge of milk substantially ceases.

7. The combination with a milking machine having teat connections for conducting milk by vacuum from the cow to the can, of a control unit interposed in each of said connections for causing the shutting off of the vacuum thereto when the companion quarter of the cow's bag is milked out including a fluid-filled body having a collapsible tube section extending axially of and in fluid-sealed relation thereto and in vacuum and milk flow communication with said connection, said body having means thereon for detachably receiving the opposing ends of said connection, means for venting the opposite ends of said tube-section to the atmosphere, and a fluid reservoir applied to and in valved communication with said body and having a deflatable wall section.

8. The combination with a milking machine having teat connections for conducting milk by vacuum from the cow to the can, of a control unit interposed in each of said connections for causing the shutting off of the vacuum thereto when the companion quarter of the cow's bag is milked out including a body having a collapsible tubular section in vacuum and milk flow communication with said connection and a fluid chamber surrounding the same, a fluid reservoir in operative relation to said fluid chamber for the interflow of the fluid therebetween, and fluid-actuated valve means disposed between said reservoir and said fluid chamber for automatically governing the flow of fluid from the reservoir to said chamber and from the latter to said reservoir, one of said valve means being displaceable to an open position to cause a complete collapse of said tubular section to a closed position when the flow of milk therethrough has stopped.

9. The combination with a milking machine having teat connections for conducting milk by vacuum from the cow to the can, of a control unit interposed in each of said connections for causing the shutting off of the vacuum thereto when the companion quarter of the cow's bag is milked out including a body having a collapsible tubular section in vacuum and milk flow communication with said connection and a fluid chamber surrounding the same, a fluid reservoir in operative relation to said fluid chamber for the interflow of the fluid therebetween, and valve fluid-actuated means disposed between said reservoir and said fluid chamber for automatically governing the flow of fluid from the reservoir to said chamber and from the latter to said reservoir, one of said valve means being displaceable to an open position to cause a complete collapse of said tubular section to a closed position when the flow of milk therethrough has stopped, and the other valve means being adapted to open only during the return flow of the fluid from said fluid chamber to the reservoir.

10. The combination with a milking machine having teat connections for conducting milk by vacuum from the cow to the can, of a control unit interposed in each of said connections for causing the shutting off of the vacuum thereto when the companion quarter of the cow's bag is milked out including a body having a collapsible tubular section in milk and vacuum flow communication with said connection and a fluid chamber surrounding the same, a fluid reservoir about said fluid chamber having a deflatable outer wall, and valve means disposed between said chamber and said reservoir for governing the interflow of fluid to and from the same.

11. The combination with a milking machine having teat connections for conducting milk by vacuum from the cow to the can, of a control unit interposed in each of said connections for causing the shutting off of the vacuum thereto when the companion quarter of the cow's bag is milked out including a collapsible tube member coaxial with such connection and through which the milk passes, displaceable means disposed in external relation to said tube member and responsive to the vacuum in said connection when such quarter is milked out for causing the drawing together of said tube member to a sealed position, and other means engageable with the opposite sides of the tube member for releasably holding it in its sealed position.

12. The combination with a milking machine having teat connections for conducting milk by vacuum from the cow to the can, of a control unit interposed in each of said connections for causing the shutting off of the vacuum thereto when the companion quarter of the cow's bag is milked out including a collapsible tube member coaxial with such connection and through which the milk passes, displaceable means disposed in external relation to said tube member and responsive to the vacuum in said connection when such quarter is milked out for causing the drawing together of said tube member to a sealed position, and pairs of normally contracted, foldable links operatively connected to the opposite sides of said tube member for movement to an unfolded extended position during the drawing of such member to its sealed position, each pair of links including a finger for releasable engagement with the tube member in the unfolded position of the the links.

13. In a control device for milking machines having a teat cup connection for conducting the milk by vacuum from the cow, a chambered body having means at its opposite ends adapted for connection to the teat cup connection, a collapsible tube member fitted axially of said body and forming a continuation of said connection for the flow of milk therethrough, and means disposed adjacent the opposite ends of the collapsible tube member for venting the same to the atmosphere.

14. In a control device for milking machines having a teat cup connection for conducting the milk by vacuum from the cow, a chambered body having means at its opposite ends adapted for connection to the teat cup connection, and a tube member fitted axially of said body in vented communication at its ends with the atmosphere and forming a continuation of said connection for the flow of milk therethrough, said tube member including an intermediate collapsible section and end attaching sections fitted in the bores of said body means and having means thereon engaging the latter to prevent axial displacement of the tube member relative to the body.

15. In a control device for milking machines having a teat cup connection for conducting the milk by vacuum from the cow, a body having inner and outer intercommunicating fluid chambers therein and having means at its opposite ends adapted for connection to the teat cup connection, the outer chamber having a collapsible wall, a collapsible tube member fitted axially of said inner chamber in vented communication at its ends with the atmosphere and forming a continuation of said connection for the flow of milk therethrough, and automatically-governed valve means for controlling the interflow of fluid in said chambers.

16. In a control device for milking machines having a teat cup connection for conducting the milk by vacuum from the cow, a body having inner and outer intercommunicating fluid chambers therein and having means at its opposite ends adapted for connection to the teat cup connection, the outer chamber having a collapsible wall, a collapsible tube member fitted axially of said inner chamber in vented communication at its ends with the atmosphere, and forming a continuation of said connection for the flow of milk therethrough, a displaceable valve assembly between said inner and outer chambers providing a normal venting therebetween and adapted for displacement to an open position to cause a quick flow of the fluid from the outer chamber into the inner chamber to cause the complete collapse of said tube member when the flow of milk therethrough substantially ceases, and a normally closed check valve between said chambers adapted to open to cause the return flow of the fluid from the inner chamber to the outer chamber to cause the inflation of the tube member to its open milk flow position.

17. In a control device for milking machines having a teat cup connection for conducting the milk by vacuum from the cow, a body adapted to be interposed in the teat connection, a collapsible tube section extending through said body and in milk flow communication with the teat connection, means disposed within said body and operable against said tube section when the flow of milk has stopped for causing its collapse to a closed position, and foldable link means operatively disposed between said body and the opposite sides of said tube section to extend and contract with the collapse and inflation of the latter and having members thereon for holding the tube section together upon the extension of such link means.

18. A control device of the character described, comprising a conduit for conducting a liquid by vacuum from a source of supply to a receiving container, said conduit including a collapsible section, means disposed adjacent the opposite ends of the collapsible section of said conduit for venting the same to the atmosphere, and displaceable regulating means disposed in operative relation to said collapsible conduit-section for normally maintaining it open and for causing its collapse subsequent to the flow stoppage of liquid through the conduit.

19. A control device of the character described, comprising a conduit for conducting a liquid by vacuum from a source of supply to a receiving container, said conduit including a collapsible section, means disposed adjacent the opposite ends of the collapsible section of said conduit for venting the same to the atmosphere, the latter having bars applied transversely to its diametrically opposite sides to effect a uniform collapse of such section, and vacuum-responsive fluid means disposed in operative relation to said collapsible conduit-section for causing its collapse subsequent to the flow stoppage of liquid through the conduit.

20. A control device of the character described, comprising a body, a conduit in operative relation thereto for conducting a liquid by vacuum from a source of supply to a receiving container, said conduit including a collapsible section enclosed within said body, means disposed adjacent the opposite ends of the collapsible section of said conduit for venting the same to the atmosphere, vacuum responsive means in said body and in operative relation to said collapsible conduit-section for causing its collapse subsequent to the flow stoppage of liquid through the conduit, and releasable means interposed between said body and the opposite sides of said collapsible section for engaging the latter to retain it in its collapsed position.

21. A control device of the character described, comprising a body, a conduit in operative relation thereto for conducting a liquid by vacuum from a source of supply to a receiving container, said conduit including a collapsible section enclosed within said body, means disposed adjacent the opposite ends of the collapsible section of said conduit for venting the same to the atmosphere, vacuum responsive means in said body and in operative relation to said collapsible conduit-section for causing its collapse subsequent to the flow stoppage of liquid through the conduit, foldable link means operatively disposed between said body and the opposite sides of said collapsible section to unfold and fold with the collapse and inflation of the latter and having members thereon for retaining the collapsible section together upon the unfolding of the link means, and means in operative relation to said foldable link means for urging the latter to their final unfolded position at a predetermined time in their movement to such position.

22. In a control device for milking machines having teat cup connections for conducting the milk by vacuum from the cow, a hollow body adapted to be interposed in a teat cup connection and having a collapsible tubular section extending therethrough in vacuum and milk flow communication with said connection, and vacuum-influenced, fluid displaceable means disposed in said body and in operative governing relation to said section for causing its complete collapse only when the flow of milk therethrough substantially ceases and for restraining its collapse during normal milking conditions.

23. In a control device for milking machines having a teat cup connection for conducting the milk by vacuum from the cow, a hollow body adapted to be interposed in a teat cup connection and having a collapsible section extending therethrough in vacuum and milk flow communication with said connection, and pressure-exerting, valve-controlled means in said body in governing relation to said collapsible section for regulating its collapse to a position to cut off the vacuum to the teat connection when the flow of milk therethrough substantially ceases.

24. In a control device for milking machines having teat cup connections for conducting the milk by vacuum from the cow, a hollow body adapted to be interposed in a teat cup connection and having a collapsible section extending therethrough in vacuum and milk flow communication with said connection, means disposed in said body and in operative governing relation to said member for causing its complete collapse only when the flow of milk therethrough substantially ceases and for restraining its collapse during normal milking conditions, and means providing vents to the atmosphere adjacent the opposite ends of the collapsible section and the opposing ends of the teat cup connection for destroying the vacuum therein, subsequent to the collapse of said section, and causing the cup end of the connection to drop from the cow and the collapsed section to return to its distended position.

25. In a control device for milking machines having teat cup connections for conducting the milk by vacuum from the cow, a hollow body forming a fluid chamber and having a fluid reservoir in communication therewith, valve means between said chamber and said reservoir for governing the flow of fluid from the reservoir to the chamber and from the latter to the former, and a vacuum-influenced collapsible tube-like section extending through said chamber in fluid-sealed relation thereto and in communication at its ends with the teat cup connection of the milking machine.

ALBERT G. PERKINS.

REFERENCES CITED

The following references are of record in the file of this patent:

UNITED STATES PATENTS

| Number | Name | Date |
|---|---|---|
| 1,387,983 | Hofmeister | Aug. 16, 1921 |
| 2,396,544 | Voyle et al. | Mar. 12, 1946 |
| 2,445,904 | Bloemers | July 27, 1948 |
| 2,496,307 | Perkins | Feb. 7, 1950 |

FOREIGN PATENTS

| Number | Country | Date |
|---|---|---|
| 621,883 | France | Feb. 14, 1927 |
| 59,661 | Denmark | Mar. 30, 1942 |